United States Patent
Lee et al.

(10) Patent No.: US 8,387,101 B2
(45) Date of Patent: Feb. 26, 2013

(54) METHOD AND APPARATUS FOR PROVIDING SERVICE AND METHOD AND APPARATUS FOR PERFORMING COMMUNICATION

(75) Inventors: Jong-rip Lee, Bucheon-si (KR); Ye-youl Lee, Seoul (KR); Min-gyu Lee, Hwaseong-si (KR); Hyung-chan Kim, Suwon-si (KR); Si-cheol Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 12/339,899

(22) Filed: Dec. 19, 2008

(65) Prior Publication Data
US 2009/0187961 A1 Jul. 23, 2009

(30) Foreign Application Priority Data
Jan. 23, 2008 (KR) .................. 10-2008-0007079

(51) Int. Cl.
*H04N 7/173* (2011.01)
*H04N 7/16* (2011.01)

(52) U.S. Cl. ............ 725/97; 725/87; 725/100; 725/132; 725/136; 725/137

(58) Field of Classification Search .................. 725/87, 725/100, 136, 137
See application file for complete search history.

(56) References Cited

U.S. PATENT DOCUMENTS

| | | | |
|---|---|---|---|
| 2006/0015889 A1* | 1/2006 | Cho | 725/6 |
| 2006/0020950 A1* | 1/2006 | Ladd et al. | 719/328 |
| 2007/0124796 A1* | 5/2007 | Wittkotter | 725/136 |
| 2008/0134156 A1* | 6/2008 | Osminer et al. | 717/140 |

\* cited by examiner

*Primary Examiner* — Kieu Oanh T Bui
(74) *Attorney, Agent, or Firm* — Sughrue Mion, PLLC

(57) ABSTRACT

A method and apparatus for providing an interactive service and a method and apparatus for performing communication are provided. An Open Cable Application Platform (OCAP) application may be directly executed in at least one broadcasting receiving apparatus by determining whether an application for providing the interactive service is independently executable using middleware installed in the broadcasting receiving apparatus and selectively requesting a set-top box to provide data needed for executing the application based on the determination result.

21 Claims, 4 Drawing Sheets

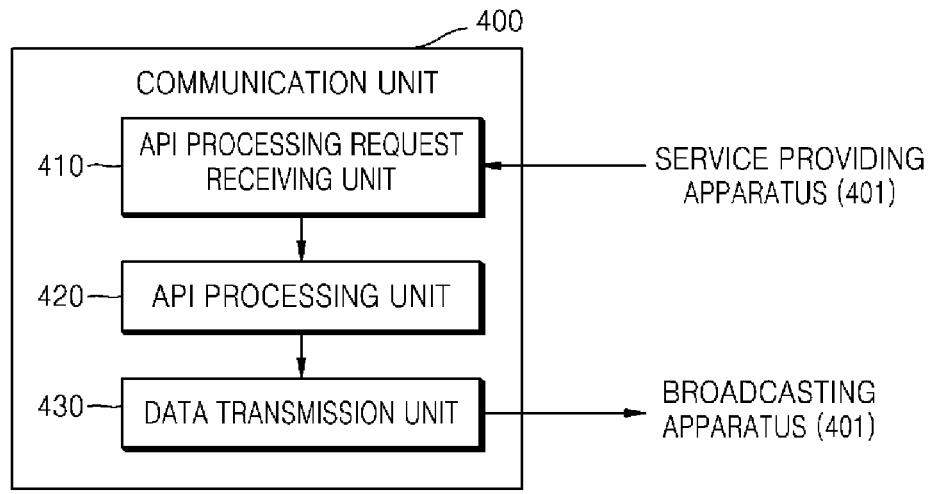
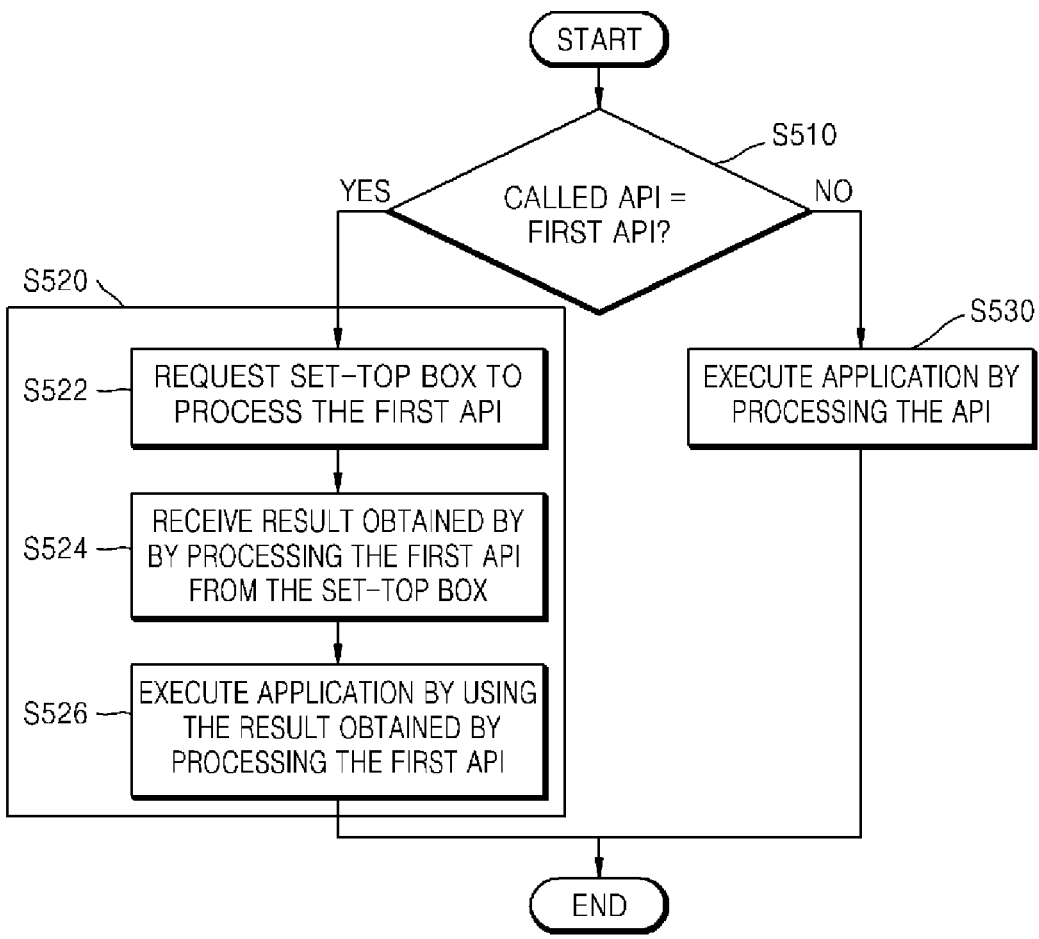

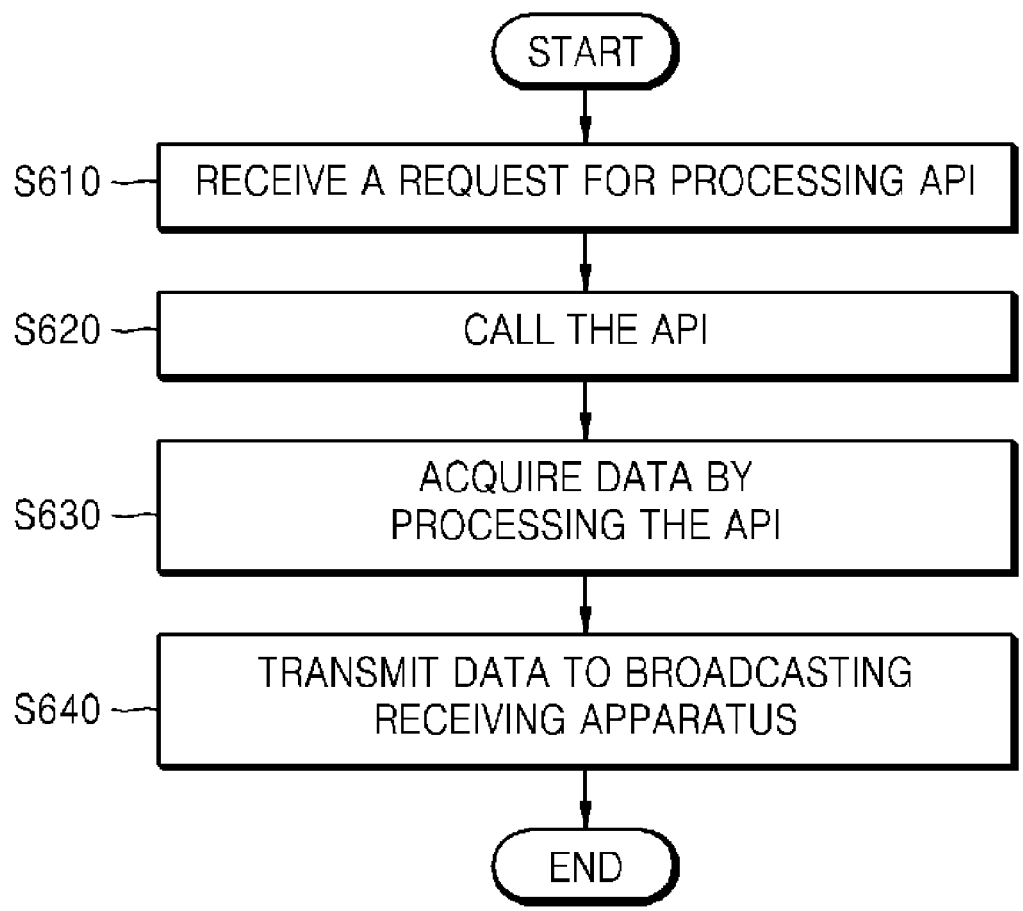

METHOD AND APPARATUS FOR PROVIDING SERVICE AND METHOD AND APPARATUS FOR PERFORMING COMMUNICATION

CROSS-REFERENCE TO RELATED PATENT APPLICATION

This application claims priority from Korean Patent Application No. 10-2008-0007079, filed on Jan. 23, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to providing a service and performing communication, and more particularly to a method and apparatus for providing an interactive service in a broadcasting receiving apparatus, and a method and apparatus for performing communication.

2. Description of the Related Art

Since a cable broadcasting service provides an interactive function, high transmission speed, and large-capacity transmission, it is possible to provide a high quality interactive service. In addition, cable broadcasting services are expected to become the most suitable media for broadcasting communication fusion services.

In order to enable a digital cable broadcasting service to be interactive, a set-top box (STB) that is a control box for receiving a broadcasting service and embodying various additional functions is necessary.

Since an STB is used to receive a digital broadcasting service with high image quality and high sound quality and provide an interactive service, the STB is an important element of the broadcasting service.

The main function of an STB is to receive broadcasting data from a broadcasting data provider. Recently, STBs have been developed to have various additional functions such as a communication function, a personal video recorder (PVR) function, an electronic program guide (EPG) function, and the like.

The OpenCable standard employed as a domestic digital broadcasting standard is largely divided into hardware and software parts.

First, the hardware part is constructed with an STB and a point of deployment (POP) device obtained by separating a security function and a conditional receiving function from the STB. The software part is the OpenCable Application Platform (OCAP) standard that is middleware.

The OCAP standard provides a basis for generating an application for providing an interactive service in digital cable broadcasting services. In the OCAP, it is possible to support a developed interactive service by providing a web-based service for the digital cable broadcasting service. In a method of providing an interactive service using the Open-Cable standard, application software and contents are shared by using a common middleware platform, that is, the OCAP.

On the other hand, as technology has developed, a family home may include a plurality of televisions (TVs). Conventionally, only a TV which is connected to an STB can receive a digital broadcasting service. Additional STBs have to be provided so that each of the plurality of TVs receive the digital broadcasting service. In order to solve this problem, the High Definition Audio-Video Network Alliance (HANA) design guideline has been suggested so as to integrally control devices and share high definition (HD) contents by connecting a DTV to peripherals through an IEEE 1394 cable. In the HANA design guideline, a web browser and a decoder are installed in the DTV, and a web server and a control page are installed in the peripherals.

In the aforementioned HANA design guideline, digital broadcasting signals and HD contents stored in the peripherals are decoded by the DTV, and the peripherals are integrally controlled in a graphical user interface (GUI) form by using the web browser of the DTV.

In the HANA design guideline, it is possible to control all the devices connected to an IEEE 1394 network by using a universal remote control.

HANA-compliant products include an HANA DTV, a TV node, an A/V HDD, an HANA expandable home theater (XHT) STB cable network interface unit (NIU), and the like. The NIU performs the function of the STB. The NIU executes an EPG function, a pay per view (PPV) function, a video on demand (VOD) function, and a shopping program function, in response to a request of a user, or processes transmission and reception of data. The NIU provides the execution result to the DTV in a hypertext markup language (HTML) format.

However, it is impossible for the DTV connected to the HANA solution to provide the interactive service by directly executing an application. In a case where the OCAP middleware is installed in an STB that is connected to an HANA device through the IEEE 1394 standard by using the Open-Cable technique, a predetermined application that operates on MHP middleware or OCAP middleware is not provided in the HTML format.

Finally, the NIU directly executes the application and transmits the execution result to the DTV in the HTML format. Accordingly, the DTV may provide the interactive service. In this case, a command of the user has to be firstly transmitted to the NIU so that a service is provided to the user after the user requests the service to be provided. Since the DTV and the NIU are connected through a network, it takes time to transmit data. Specifically, since the NIU has to execute the application according to the command of the user and transmit the execution result to the DTV, there is a time difference between a time when the user requests the service to be provided and a time when the service is actually provided to the user.

In order to solve this problem, the OCAP middleware may be extended or modified, and re-installed in the DTV. However, if the OCAP middleware is modified or extended, a license used for a case where the OCAP is applied is too expensive, or it is too expensive to customize the OCAP middleware.

SUMMARY OF THE INVENTION

The present invention provides a method of providing a service and a method for performing communication so as to efficiently provide an interactive service by using a broadcasting receiving apparatus, and a broadcasting receiving apparatus and a set-top box for efficiently providing an interactive service.

According to an aspect of the present invention, there is provided a method of providing an interactive service by using a broadcasting receiving apparatus for receiving a broadcasting service through a set-top box, the method comprising: determining whether an application for providing the interactive service is independently executable by using installed middleware; and selectively requesting the STB to provide data needed for executing the application based on the determination result.

In the determining whether the application is independently executable, it may be determined whether the application calls a first application programming interface (API) that is to be processed by the STB, and wherein in the selectively requesting the STB to provide the data, when the application calls the first API, the STB is requested to process the first API.

The method of providing an interactive service may further comprise receiving the result obtained by processing the first API from the STB; and executing the application by using the processed result.

The middleware may be the same as middleware installed in the STB.

The middleware may be defined in the OCAP standard or the MHP standard, and wherein the application is an OCAP middleware-based application or an MHP middleware-based application.

The STB may be connected to at least one device including the broadcasting receiving apparatus through a home network, and wherein the broadcasting receiving apparatus is a digital TV set.

According to another aspect of the present invention, there is provided a communication method for providing an interactive service to a broadcasting receiving apparatus for receiving a broadcasting service through a set-top box, the communication method comprising: receiving a request for processing an API that is not independently processable by using the broadcasting receiving apparatus from the broadcasting receiving apparatus for executing an application for providing the interactive service; calling the API corresponding to the request; acquiring data by processing the called API; and transmitting the acquired data to the broadcasting receiving apparatus.

The STB may be connected to at least one device including the broadcasting receiving apparatus through a home network, and wherein the broadcasting receiving apparatus is a digital TV set.

Middleware defined in the OCAP standard or the MHP standard may be installed in the STB, and wherein the application is an OCAP middleware-based application or an MHP middleware-based application.

Middleware that is the same as the middleware installed in the STB may be installed in the broadcasting receiving apparatus.

According to another aspect of the present invention, there is provided an apparatus for receiving a broadcasting service through a set-top box and providing an interactive service, the apparatus comprising: an execution unit executing an application for providing the interactive service by using installed middleware; a determination unit determining whether the application is independently executable; and a data request unit selectively requesting the STB to provide data needed for executing the application based on the determination result.

According to another aspect of the present invention, there is provided an apparatus for performing communication so as to provide an interactive service to a broadcasting receiving apparatus, the apparatus comprising: an API processing request receiving unit receiving a request for processing an API that is not independently processable by using the broadcasting receiving apparatus from the broadcasting receiving apparatus for executing an application for providing the interactive service and calling the requested API; an API processing unit acquiring data by processing the called API; and a data transmission unit transmitting the data acquired by the API processing unit to the broadcasting receiving apparatus.

BRIEF DESCRIPTION OF THE DRAWINGS

The above and other aspects of the present invention will become more apparent by describing in detail exemplary embodiments thereof with reference to the attached drawings in which:

FIG. 4 is a block diagram illustrating a communication apparatus for providing an interactive service to a service providing apparatus according to an exemplary embodiment of the present invention;

FIG. 5 is a flowchart illustrating a method of providing an interactive service by using a broadcasting receiving apparatus, according to an exemplary embodiment of the present invention; and FIG. 6 is a flowchart illustrating a communication method for providing an interactive service to a broadcasting receiving apparatus by using an STB, according to an exemplary embodiment of the present invention.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
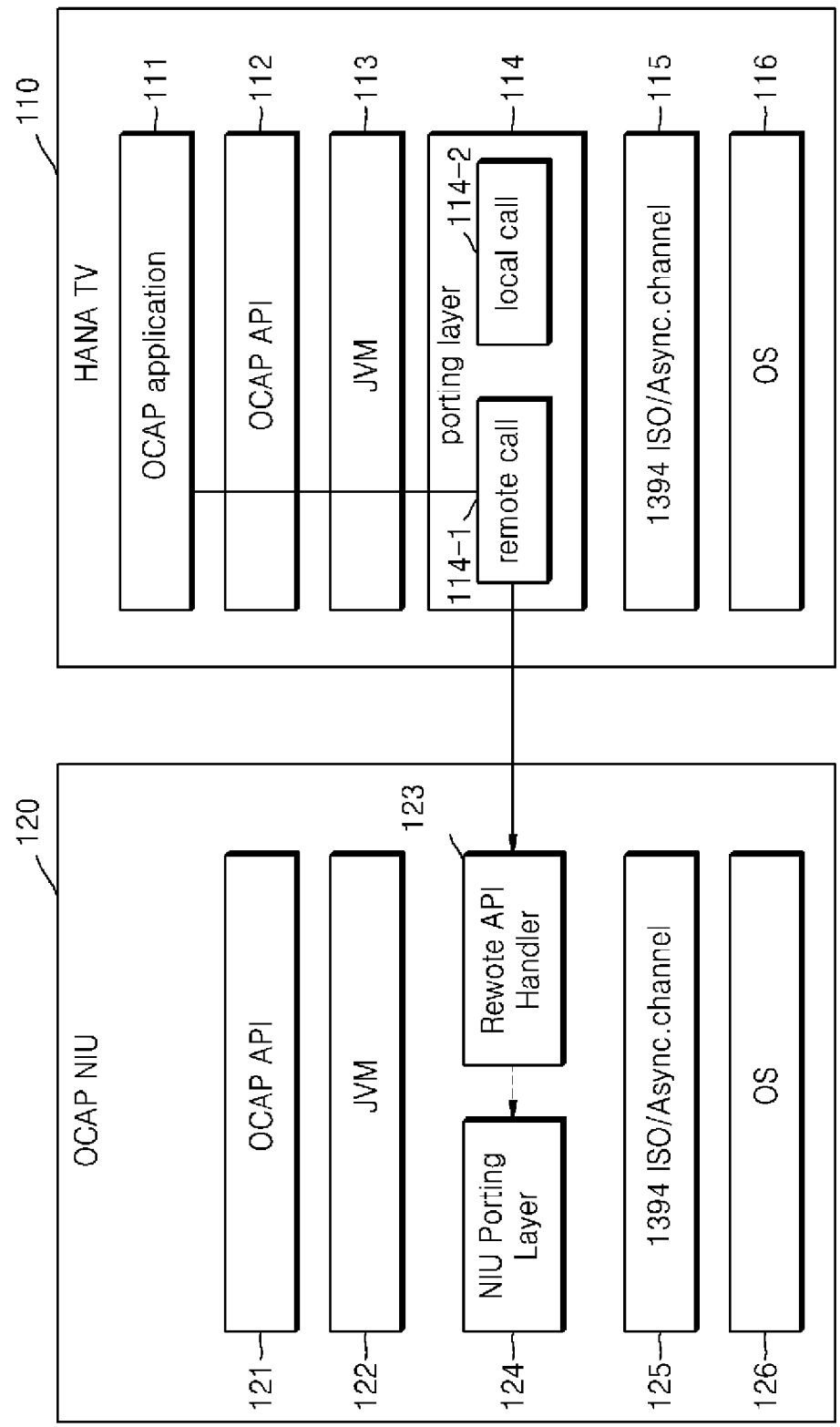
FIG. 1 is a block diagram illustrating a system for providing a service to a broadcasting receiving apparatus, according to an exemplary embodiment of the present invention.

FIG. 1 is a block diagram illustrating a system for providing a service to a broadcasting receiving apparatus, according to an exemplary embodiment of the present invention.

Referring to FIG. 1, the system according to the current exemplary embodiment includes an HANA TV 110 and an OCAP network interface unit (NIU) 120. The system enables an OCAP application to be executed on the HANA TV 110.

The HANA TV 110 includes an OCAP API 112, a Java virtual machine (JVM) 113, a porting layer 114, an IEEE 1394 channel 115, and an operating system (OS) 116.

The OCAP API 112 indicates APIs according to an OCAP standard.

The JVM 113 serves to analyze an API written in Java by using a virtual computer and apply the API so that the API is processed by the OS 116. In the current exemplary embodiment, the JVM 113 applies the API suitably for the OS 116 so that the OCAP API can be processed by the HANA TV 110. The OCAP API 112 and the JVM 113 constitute middleware throughout the specification. The OCAP API 112 operates on the JVM 113. An apparatus including the JVM 113 can process the OCAP API 112 without additional modification.

The porting layer 114 allocates system resources such as memories so as to process the API called by the JVM 113. The API is processed by using the allocated system resources.

The porting layer 114 includes a local call 114-2 and a remote call 114-1.

The local call 114-2 is a module for processing APIs which are independently processed by the HANA TV 110. The independently processable APIs are mainly related to graphic processing. The APIs process graphics and display the graphics in a GUI form. That is, the local call 114-2 processes only APIs for which it is unnecessary to externally receive data.

On the other hand, like a case where data has to be processed through an external network or a case where data has to be received through the external network, an API that uses system resources (for example, a tuner) in the API and the OCAP NIU 120 which have to externally receive data is processed by the OCAP NIU 120 through the remote call 114-1 to be described later. The local call 114-2 is functionally the same as an NIU porting layer 124 in the OCAP NIU 120. Accordingly, a module of the NIU porting layer 124 may be reused for the local call 114-2.

The remote call 114-1 induces APIs which are not independently processable on the HANA TV 110 to be processed by the OCAP NIU 120. The remote call 114-1 requests the OCAP NIU 120 to process the APIs by using a remote procedure call (RPC) and receives the processed result. The RPC is used to call a function to be executed in a first device by using a second device. If the second device calls a desired function through the RPC, the first device processes the function and returns the processed result to the second device.

The APIs which are not independently processable on the HANA TV 110 are mainly related to processing of data. For example, in the APIs, like the interactive service, data generated by the HANA TV 110 has to be processed by an external server and transmitted to the HANA TV 110, again. In addition, even in a case where the API has to use shared resources such as a tuner cable card, the API has to be processed by the OCAP NIU 120.

The IEEE 1394 channel 115 is a type of a data cable for connecting the OCAP NIU 120 to the HANA TV 110. The IEEE 1394 channel 115 can embody a fast home network as compared with a local area network (LAN).

The OS 116 is installed in the HANA TV 110.

The OCAP NIU 120 connects at least one HANA TV 110 to peripherals through the IEEE 1394 cable. The OCAP NIU 120 serves to receive broadcasting data with a format of MPEG-2 TS and electronic program guide (EPG) information and transmit the broadcasting data and the EPG information or serves to perform a series of operations related to a broadcasting service such as a tuning service for tuning a channel to a desired broadcasting channel. In addition, data for providing an interactive service to the HANA TV 110 is requested and received through an external communication network.

The OCAP NIU 120 includes an OCAP API 121, a JVM 122, a remote API handler 123, an NIU porting layer 124, an IEEE 1394 channel 125, and an OS 126. In the OCAP NIU 120, the OCAP API 121, the JVM 122, the IEEE 1394 channel 125, and the OS 126 perform the same functions as corresponding elements in the HANA TV 110. Accordingly, descriptions thereof are not provided.

The remote API handler 123 calls an API which is requested through the remote call 114-2 to be processed. Since the same middleware is installed in the OCAP NIU 120 and the HANA TV 110, it is possible to easily call the API called by the remote call 114-2 without additional mapping information.

The NIU porting layer 124 processes the API called by the remote API hander 123 and transmits the processed result to the HANA TV 110.

In the exemplary embodiment, it is possible to execute an application in the HANA TV 110 by installing OCAP middleware 112 and 113 in the HANA TV 110 without modifying or extending middleware according to the OCAP standard. However, in a case where the API is not independently processable on the HANA TV 110, it is possible to execute the application by processing the API by using the remote call 114-2 in the OCAP NIU 120.

Figure 2:
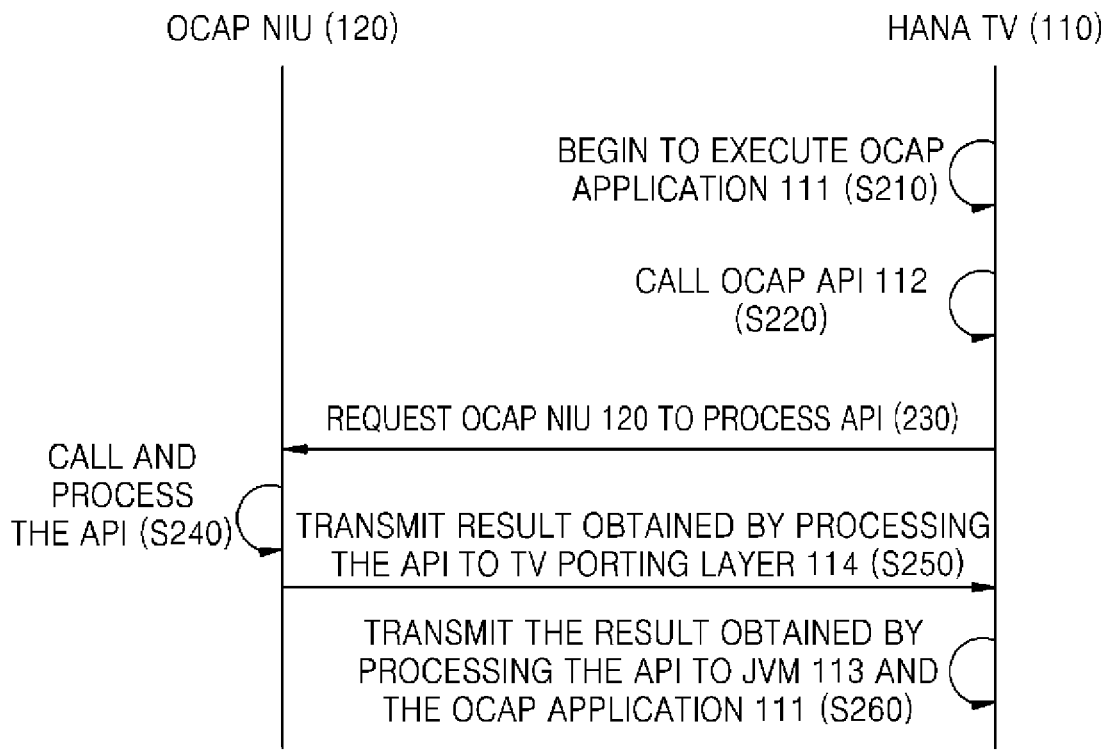
FIG. 2 is a flowchart illustrating a method of executing an application by using the system of FIG. 1, according to an exemplary embodiment of the present invention.

FIG. 2 is a flowchart illustrating a method of executing an application by using the system of FIG. 1, according to an exemplary embodiment of the present invention.

In operation S210, the HANA TV 110 starts to execute the OCAP application 111.

More specifically, the user selects a desired device from among devices connected to a home network. In FIG. 2, a case where the user selects the OCAP NIU 120 by using an interface of the HANA TV 110 in order to receive a service from the OCAP NIU 120 is assumed. If the user selects the OCAP NIU 120, a list of OCAP applications provided by the OCAP NIU 120 is displayed on the HANA TV 110. If the user selects a desired OCAP application, the application is downloaded to the HANA TV 110. The downloaded OCAP application is registered in an OCAP monitor application (not shown) in the HANA TV 110. The OCAP monitor application (not shown) is an API for monitoring types and execution information of an application to be executed on the HANA TV 110. The downloaded OCAP application is executed in the HANA TV 110.

The OCAP application 111 indicates an OCAP-based application throughout the specification. The OCAP application 111 may be previously downloaded to the HANA TV 110 through the OCAP NIU 120.

In operation S220, the OCAP application 111 calls a necessary OCAP API 112. The OCAP API 112 calls the JVM 113. The JVM 113 calls the TV porting layer 114 sin order to process the called API.

In operation S230, the TV porting layer 114 determines whether the called API is independently processable in the HANA TV 110 and selectively requests the OCAP NIU 120 to process the API. That is, in a case where the called API is independently processable on the HANA TV 110, the local call 114-2 directly processes the API. However, in a case where the called API is not independently processable on the HANA TV 110, for example, a case where the called API has to consume resources on the OCAP NIU 120 or process data through a network, the OCAP NIU 120 is requested to process the API through the remote call 114-1. A method of requesting the API to be processed by using the remote call 114-1 may be performed by the RPC.

In operation S240, the remote API handler 123 calls an API corresponding to a request of the remote call 114-1. The NIU porting layer 124 processes the called API.

In operation S250, the result obtained by processing the API is transmitted to the TV porting layer 114.

In operation S260, the processed result is transmitted to the JVM 113 and the OCAP application 111.

Figure 3:
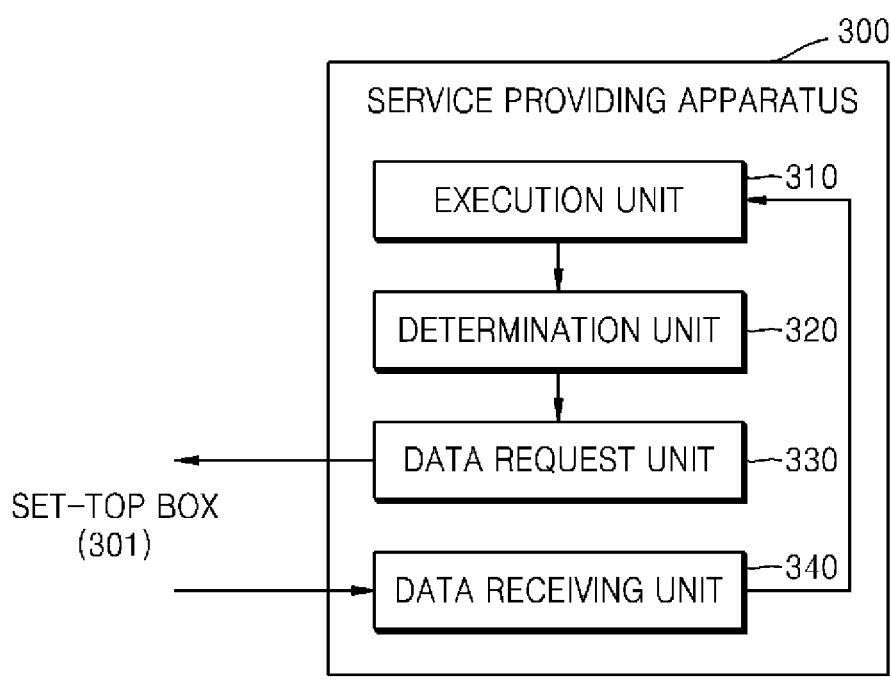
FIG. 3 is a block diagram illustrating a service providing apparatus for providing an interactive service, according to an exemplary embodiment of the present invention.

FIG. 3 is a block diagram illustrating a service providing apparatus 300 for providing an interactive service, according to an exemplary embodiment of the present invention.

Referring to FIG. 3, the service providing apparatus 300 according to the current exemplary embodiment of the present invention includes an execution unit 310, a determination unit 320, a data request unit 330, and a data receiving unit 340. The service providing apparatus 300 is one of a plurality of devices connected to an STB through a home network. In this regard, the service providing apparatus 300 may be an HANA-based digital TV set.

The execution unit 310 executes an application for providing an interactive service by using middleware installed in the service providing apparatus 300.

In a case where the STB 301 receives broadcasting data through a cable, middleware defined in an OCAP standard is installed in the STB 301 and the service providing apparatus 300. On the other hand, in a case where the STB 301 receives broadcasting data through a satellite antenna, middleware defined in the MHP standard is installed in the STB 301 and the service providing apparatus 300.

If the OCAP middleware is installed in the service providing apparatus 300, the execution unit 310 executes the OCAP based application by using the OCAP middleware. The execution unit 310 calls an API needed for executing an application as shown in the exemplary embodiments of FIGS. 1 and 2 and processes the called API through the JVM and the porting layer. The result obtained by processing the API may be transmitted to the application or displayed to the user.

The determination unit 320 determines whether the application is independently executable in the service providing apparatus 300 based on a type of the API called by the application. If the application calls a first API that has to be processed by the STB 301, it is determined that the application is not independently processable in the service providing apparatus 300.

The first API includes APIs which have to use resources on the STB, such as a tuner and a cable card, and APIs for processing data through a network in an application for providing an interactive service.

For example, it is assumed that the user executes an application for purchasing a product. If the user selects a corresponding application, an API for displaying an initial window for purchasing a product or displaying product information is called. Since the API performs a graphic process irrelevant to data processing, the execution unit 310 independently processes the API and displays the initial window for purchasing the product or the product information.

Subsequently, if the user selects a desired product, an API for paying for the product is called. The API for paying for the product is the first API that is not independently processable by using the execution unit 310. The determination unit 320 determines that the application is not independently processable.

The data request unit 330 selectively requests the STB to provide data needed for executing the application based on the determination result of the determination unit 320. That is, if the application calls the first API, the data request unit 330 requests the STB 301 to process the first API.

Middleware that is the same as the middleware installed in the service providing apparatus 300 may be installed in the STB 301.

If the middleware installed in the STB is different from the middleware installed in the service providing apparatus 300, the data request unit 330 has to further include additional mapping information so that the STB 301 calls the API with the same function as the first API. However, if the middleware installed in the STB 301 is the same as the middleware installed in the service providing apparatus 300, the data request unit 300 can easily request the first API to be processed without additional mapping information. The data request unit 330 can induce the STB 301 to call the first API by using the RPC.

The data receiving unit 340 receives the result obtained by processing the first API from the STB 301.

The execution unit 310 executes the application by using the result obtained by processing the first API which is received by the data receiving unit 340.

FIG. 4 is a block diagram illustrating a communication apparatus 400 for providing an interactive service to a service providing apparatus 401, according to an exemplary embodiment of the present invention. The communication apparatus 400 may be a set-top box and service providing apparatus 401 may be a broadcasting receiving apparatus such as a digital TV.

Referring to FIG. 4, the communication apparatus 400 according to the current exemplary embodiment of the present invention includes an API processing request receiving unit 410, an API processing unit 420, and a data transmission unit 430. The communication apparatus 400 is connected to devices including at least one broadcasting receiving apparatus through a home network. The broadcasting receiving apparatus may be an HANA-based digital TV.

The API processing request receiving unit 410 receives a request for processing an API that is not independently processable by using the service providing apparatus 401 from the broadcasting receiving apparatus 401 for executing an application for providing an interactive service and calls the requested API. The API processing request receiving unit 410 may receive a request for processing the API by using the RPC from the service providing apparatus 401.

The API processing unit 420 acquires data by processing the called API.

The data transmission unit 430 transmits the data acquired by the API processing unit 420 to the service providing apparatus 401.

The middleware defined in the OCAP or MHP standard may be installed in the communication apparatus 400. At this time, an application for providing an interactive service may be an OCAP middleware-based application or an MHP middleware-based application. Specifically, the same middleware is installed in the communication apparatus 400 and the service providing apparatus 401 so that the broadcasting receiving apparatus 401 request the communication apparatus 400 to process the API without additional mapping information.

FIG. 5 is a flowchart illustrating a method by which an application for providing an interactive service is executed by using a broadcasting receiving apparatus, according to an exemplary embodiment of the present invention.

In operation S510, it is determined whether an API called by the application is a first API. As described above, the first API indicates an API that is not independently processable in the broadcasting receiving apparatus. If it is determined that the API called by the application is the first API, the API is not independently processable in the broadcasting receiving apparatus. Accordingly, an STB is requested to process the first API by performing operation S520. However, in a case where it is determined that the API called by the application is not the first API, the API is independently processed in the broadcasting receiving apparatus by performing operation S530.

In operation S520, the STB is requested to provide data needed for executing the application. If the application calls first API data, the result data obtained by processing the first API may be data needed for executing the application.

Operation S520 may be performed by performing operations 522 to 526.

In operation S522, the STB is requested to process the first API requested by the application.

In operation S524, the result obtained by processing the first API is received from the STB.

In operation S526, the application is executed by using the result obtained by processing the first API.

In operation S530, if the API called by the application is not the first API, the called API is independently processed in the broadcasting receiving apparatus.

FIG. 6 is a flowchart illustrating a communication method for providing an interactive service to a broadcasting receiving apparatus by using an STB, according to an exemplary embodiment of the present invention. The STB is connected to at least one device including a broadcasting receiving apparatus through a home network. The broadcasting receiving apparatus may be a digital TV.

In operation S610, a request for processing an API that is not independently processable by using the broadcasting receiving apparatus is received from the broadcasting receiving apparatus for executing an application for providing an interactive service.

In operation S620, an API corresponding to the request is called.

In operation S630, data is acquired by processing the called API.

In operation S640, the acquired data is transmitted to the broadcasting receiving apparatus.

It is possible for at least one broadcasting receiving apparatus to directly execute an OCAP application by installing the OCAP middleware in the at least one broadcasting receiving apparatus.

In addition, it is possible to use existing OCAP middleware by installing the OCAP middleware in the broadcasting receiving apparatus without extending or modifying the OCAP middleware. Accordingly, it is possible to reduce costs used for customizing an OCAP.

In addition, it is possible to increase usability of an expandable home theater (XHT) based solution and to activate an XHT standard by enabling an OCAP application to be executed in at least one broadcasting receiving apparatus connected to an STB through a home network.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and other storage media.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing an interactive service using a broadcasting receiving apparatus for receiving a broadcasting service through a set-top box, the method comprising:
determining, at the broadcasting receiving apparatus which is independent from the set-top box, whether an Application Programming Interface (API) called by an application is independently executable at the broadcasting receiving apparatus, wherein the application providing the interactive service is executed by using the broadcasting receiving apparatus; and
requesting data needed for executing the application at the broadcasting receiving apparatus to the set-top box, when it is determined that the API is not independently executable the broadcasting receiving apparatus.

2. The method of claim 1, wherein in the determining whether the API called by the application is independently executable, it is determined whether the application calls a first application programming interface (API) that is to be processed by the set-top box, and wherein in the requesting the data, if it is determined that the application calls the first API, the set-top box is requested to process the first API.

3. The method of claim 2, further comprising:
receiving, from the set-top box, a result obtained by processing the first API; and
executing the application using the result received from the set-top box.

4. The method of claim 1, wherein middleware installed in the broadcasting receiving apparatus is the same as middleware installed in the set-top box.

5. The method of claim 1, wherein middleware installed in the broadcasting receiving apparatus is defined in the Open Cable Application Platform (OCAP) standard or the Multimedia Home Platform (MHP) standard, and
wherein the application is an OCAP middleware-based application or an MHP middleware-based application.

6. The method of claim 1, wherein the set-top box is connected to at least one device including the broadcasting receiving apparatus through a home network, and
wherein the broadcasting receiving apparatus is a digital television set.

7. A non-transitory computer-readable recording medium having embodied thereon a computer program for executing the method of claim 1.

8. A communication method for providing an interactive service to a broadcasting receiving apparatus for receiving a broadcasting service through a set-top box, the communication method comprising:
receiving at the set-top box from the broadcasting receiving apparatus, a request for processing an application programming interface (API) for executing an application at the broadcasting receiving apparatus for providing the interactive service from the broadcasting receiving apparatus, when it is determined that the API is not independently processable using the broadcasting receiving apparatus;
calling the API corresponding to the request;
acquiring data by processing the called API; and
transmitting the acquired data from the set-top box to the broadcasting receiving apparatus which is independent from the set-top box.

9. The communication method of claim 8, wherein the set-top box is connected to at least one device including the broadcasting receiving apparatus through a home network, and
wherein the broadcasting receiving apparatus is a digital television set.

10. The communication method of claim 8,
wherein middleware defined in the Open Cable Application Platform (OCAP) standard or the Multimedia Home Platform (MHP) standard is installed in the set-top box, and
wherein the application is an OCAP middleware-based application or an MHP middleware-based application.

11. The communication method of claim 8, wherein middleware installed in the broadcasting receiving apparatus is the same as middleware installed in the set-top box.

12. An apparatus for receiving a broadcasting service through a set-top box and providing an interactive service, the apparatus comprising:
an execution unit which executes an application at the apparatus for providing the interactive service by using middleware installed in the apparatus;
a determination unit which determines whether an Application Programming Interface (API) called by the application is independently executable at the apparatus using the middleware, wherein the application providing the interactive service is executed by using the apparatus; and a data request unit which requests data needed for executing the application at the apparatus to the set-top box, when it is determined that the API is not independently executable at the apparatus, wherein the apparatus is independent from the set-top box.

13. The apparatus of claim 12, wherein in the determination of whether the API called by the application is independently executable, the determination unit determines whether the application calls a first application programming interface (API) that is to be processed by the set-top box, and wherein the data request unit requests the set-top box to process the first API when the application calls the first API.

14. The apparatus of claim 13, further comprising a receiving unit receiving a result obtained by processing the first API from the set-top box, wherein the execution unit executes the application by using the processed result.

15. The apparatus of claim 12, wherein the middleware installed in the apparatus is the same as middleware installed in the set-top box.

16. The apparatus of claim 12, wherein the middleware installed in the apparatus is defined in an OCAP (open cable application platform) standard or an MHP (multimedia home platform) standard, and wherein the application is an OCAP middleware-based application or an MHP middleware-based application.

17. The apparatus of claim 12, wherein the set-top box is connected to at least one device including the apparatus through a home network, and wherein the apparatus is a digital TV set.

18. An apparatus for performing communication so as to provide an interactive service to a broadcasting receiving apparatus, the apparatus comprising:

an application programming interface (API) processing request receiving unit which receives, from the broadcasting receiving apparatus, a request for processing an API for executing an application for providing the interactive service, and calls the API, when it is determined that the API is not independently processable by the broadcasting receiving apparatus;

an API processing unit which acquires data by processing the called API; and a data transmission unit which transmits the data acquired by the API processing unit to the broadcasting receiving apparatus, wherein the apparatus is independent from the broadcasting receiving apparatus.

19. The apparatus of claim 18, wherein the apparatus is a set-top box which is connected to at least one device including the broadcasting receiving apparatus through a home network, and wherein the broadcasting receiving apparatus is a digital television set.

20. The apparatus of claim 18, wherein middleware defined in the Open Cable Application Platform (OCAP) standard or the Multimedia Home Platform (MHP) standard is installed in the set-top box, and wherein the application is an OCAP middleware-based application or an MHP middleware-based application.

21. The apparatus of claim 18, wherein middleware installed in the apparatus for performing communication is the same as middleware installed in the broadcasting receiving apparatus.

* * * * *